United States Patent
Walmsley et al.

(10) Patent No.: US 6,611,336 B1
(45) Date of Patent: Aug. 26, 2003

(54) PULSE MEASUREMENT USING FREQUENCY SHIFTING TECHNIQUES

(75) Inventors: Ian A. Walmsley, Lyons, NY (US); Christopher Iaconis, Santa Rosa, CA (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 09/463,918

(22) PCT Filed: Jul. 24, 1998

(86) PCT No.: PCT/US98/15355

§ 371 (c)(1), (2), (4) Date: Apr. 12, 2000

(87) PCT Pub. No.: WO99/06794

PCT Pub. Date: Feb. 11, 1999

Related U.S. Application Data

(60) Provisional application No. 60/054,506, filed on Aug. 1, 1997.

(51) Int. Cl.[7] .................................................. G01B 9/02
(52) U.S. Cl. ........................................................ 356/450
(58) Field of Search .......................................... 356/450

(56) References Cited

U.S. PATENT DOCUMENTS

| | | |
|---|---|---|
| 3,549,239 A | 12/1970 | Brienza et al. |
| 3,551,034 A | 12/1970 | Tournois et al. |
| 3,679,313 A | 7/1972 | Rosenberg |
| 3,720,884 A | 3/1973 | Kelley et al. |
| 3,943,457 A | 3/1976 | Lehmberg |
| 4,612,641 A | 9/1986 | Corkum |
| 4,750,809 A | 6/1988 | Kafka et al. |
| 5,101,456 A | 3/1992 | Islam |
| 5,212,698 A | 5/1993 | Kafka et al. |
| 5,359,410 A | 10/1994 | Diels et al. |
| 5,453,871 A | 9/1995 | Kolner et al. |
| 5,530,544 A | 6/1996 | Trebino et al. |
| 5,535,000 A | 7/1996 | Shirasaki |
| 5,642,194 A | 6/1997 | Erskine |
| 5,684,586 A | 11/1997 | Fortenberry et al. |
| 6,456,380 B1 * | 9/2002 | Naganuma ................. 356/450 |

OTHER PUBLICATIONS

Wong, V., et al., *Analysis of ultrashort pulse–shape measurement using linear interferometers*, Optics Letters, vol. 19, No. 4, Feb. 15, 1994, pp. 287–289.

Takeda, M., et al., *Fourier–transform method of fringe–pattern analysis for computer–based topography and interferometry*, J. Opt. Soc. Am., vol. 72, No. 1, 01/82, pp. 156–160.

Reynaud, F., et al., *Measurement of phase shifts introduced by nonlinear optical phenomena on subpicosecond pulses*, Optics Letters, vol. 14, No. 5, Mar. 1, 1989, pp. 275–277.

Treacy, E., *Optic Pulse Compression With Diffraction Gratings*, IEEE Journal of Quantum Electronics, vol. QE–5, No. 9, 9/69, pp. 454–458.

Chu, K. C., et al., *Direct measurement of the spectral phase of femtosecond pulses*, Optics Letter, vol. 20, No. 8, Apr. 15, 1995, pp. 904–906.

(List continued on next page.)

*Primary Examiner*—Frank G. Font
*Assistant Examiner*—Andrew H. Lee
(74) *Attorney, Agent, or Firm*—Kenneth J. Lukacher; Martin Lukacher

(57) ABSTRACT

Amplitude and phase relative to an interferometrically established phase of ultrashort replica pulses (15) utilizes spectral phase interforemetry for direct electric field reconstruction by frequency shifting chirp replica pulses (16) of an optical pulse to be measured. The replicas of the pulses, relatively delayed in time, are generated by an interferometer (12).

21 Claims, 4 Drawing Sheets

OTHER PUBLICATIONS

Zubov, V.A., et al., *Solution of the phase problem for time–dependent optical signals by an interference system*, Sov. J. Quantum Electron, vol. 21, No. 11, 11/91, pp. 1285–1286.

Chilla, J. et al., *Direct determination of the amplitude and the phase of femtosecond light pulses*, Optics Letters, vol. 16, No. 1, Jan. 1, 1991, pp. 39–41.

Rhee, J., et al., *Real–time dispersion analyzer of femtosecond laser pulses with use of a spectrally and temporally resolved upconversion technique*, J. Opt. Soc. Am. B, vol. 13, No. 8, 8/96, pp. 1780–1785.

Prein, S., et al., *Complete characterization of femtosecond pulses using an all–electronic detector*, Optics Communications, 123, Feb. 1, 1996, pp. 567–573.

Kane, D., et al., *Characterization of Arbitrary Femtosecond Pulses Using Frequency–Resolved Optics Gating*, IEEE Journal of Quantum Electronics, vol. 29, No. 2, 2/93, pp. 571–579.

Wong, V., et al., *Ultrashort–pulse characterization from dynamic spectrograms by iterative phase retrieval*, J. Opt. Soc. Am. B, vol. 14, No. 4, 4/97, pp. 944–949.

Walmsley, I., et al., *Characterization of the electric field of ultrashort optical pulses*, J. Opt. Soc. Am. B, vol. 13, No. 11, 11/96, pp. 2453–2463.

Walmsley, I. et al., *Measuring Fast Pulses*, Optics & Photonics News, vol. 7, No. 23, pp. 24–29, 1996.

Lepetit, L. et al., *Linear techniques of phase measurement by femtosecond spectral interferometry for applications in spectroscopy*, J. Opt. Soc. Am. B, vol. 12, No. 12, pp. 2467–2474, 1995.

Rothenberg, J. et al., *Measurement of optical phase with subpicosecond resolution by time–domain interferometry*, Optics Letters, vol. 12, No. 2, pp. 99–101, 1987.

Zubov, V. et al., *Analysis of Temporal Characteristics of Optical Pulses by Means of an Acousto–Optical Cell*, Laser Physics. vol. 2, No. 1, pp. 73–76, 1992.

Diels, J. et al., *Investigation of the Parameters Affecting Subpicosecond Pulse Durations in Passively Mode Locked Dye Lasers*, Proceedings of the First International Conference on Picosecond Phenomena, Springer, New York, pp. 117–120, 1978.

Fittinghoff, D. et al., *Measurement of the intensity and phase of ultraweak, ultrashort laser pulses*, Optics Letters, vol. 21, No. 12, pp. 884–886, 1996.

Azzam, R.M.A., *Polarization Michelson Interferometer (POLMINT): its use for polarization modulation and temporal pulse shearing*, Optics Communications, vol. 98, No. 1, 2, 3, pp. 19–23 (1993).

* cited by examiner

PULSE MEASUREMENT USING FREQUENCY SHIFTING TECHNIQUES

This application claims the benefit of privisional application Ser. No. 60/054,506, filed Aug. 1, 1997.

DESCRIPTION

The present invention relates to methods and apparatus for making measurements of the amplitude and phase of ultrashort pulses and particularly ultrashort optical pulses which have a frequency range from the far infrared through the ultraviolet and have a duration in the subpicosecond range. More particularly, the invention provides methods and instrumentalities for characterizing the electric fields of ultrashort optical pulses by spectral phase interrometry for direct electric field construction of such pulses (SPIDER).

The invention is especially suitable for use in measuring ultrashort optical pulses having a duration of less than 100 picoseconds. Such pulses are useful in 2-photon and confocal microscopy, especially at low light levels, material science in the analysis of the electronic or vibrational dynamic properties of materials, lidar and lidar signal processing, medical diagnostics, including coherence tomography, phototherapies and for the detection of signals in high speed optical communication systems. By characterizing (measuring the amplitude and phase) of ultrashort optical pulses in accordance with the invention, such pulses become especially adapted for use in the detection of quantum-limited light fields with ultra precise temporal resolution thereby reducing uncertainty and lack of resolution (dynamic imaging problems) that are photon-limited (low-light) in applications such as ranging, electronic digital photography, and medical imaging.

The present invention advances autocorrelation techniques which have heretofore been used for measuring short laser pulses. In such techniques, interferometer developed identical replicas were relatively delayed in time. These pulse replicas were then recombined and passed through a nonlinear element. The resultant signal was recorded as a function of variable time delay between the replicas. However the signal provides only an estimate of the pulse amplitude and phase. In another technique, which has become to be known as frequency resolved optical gating (FROG), a spectrometer is used to analyze the intensity and phase of the signal transmitted through the nonlinear element. Such a system has required the collection of a large quantity of data and has not been found suitable for real time, high speed measurements and characterization of ultrashort optical pulses. Further information respecting the auto correlation and FROG system may be had by reference to U.S. Pat. No. 5,530,544 to Trebino et al issued Jun. 25, 1996. Another technique for characterizing optical pulses uses a dispersed replica of the pulse, but without any frequency shift of the replica. See Fortenberry et al, U.S. Pat. No. 5,684,584 issued Nov. 4, 1997.

The present invention operates on the principle of spectral shearing interferometry in which two frequency shifted (sheared) replicas of the input light pulse to be measured are interfered for spectral analysis. The frequency shear is generated by the use of a chirp pulse by mixing the chirp pulse with replicas having a delay which is much shorter than the duration of the chirp pulse so that different frequency components of the chirp (the frequency across which the pulse sweeps) convert the pulses to different frequencies. Real time measurements are facilitated by the use of a data inversion routine in processing the spectrogram data, and provide the direct electric field reconstruction of the optical pulse being measured. Since the measurements are made interferometrically as a function of the spectral phase of the pulse, the wave field (electric field) is reconstructed, the invention provides what may be termed as spectral phase interferometry for direct electric field reconstruction (SPIDER).

It is therefore an object of the present invention to provide methods and apparatus for measurement of an ultra short pulse, especially an ultra short optical pulse, using a chirp pulse and nonlinearity (as in a nonlinear mixer) to generate spectral shear and provide a signal exhibiting spectral shear corresponding to the input pulse to be measured.

Another object of the invention is to provide a system for the characterization of ultrashort optical pulses wherein data collection is minimized and real time operation is obtained in that the analysis of a spectrally sheared signal may be carried out by a direct and rapid inversion routine.

It is still a further object of the present invention to provide method and apparatus for ultrashort optical pulse measurements which has elements, for example an interferometer a pulse disperser, a nonlinear mixer, and a spectral detector which can be disposed in a collinear arrangement.

It is a further object of the present invention to provide improved methods and apparatus for the measurement of optical pulses ranging from the ultraviolet to the infrared in which nonlinear optics is used.

It is a still further object of the present invention to by methods and apparatus for characterizing pulses by making measurements of the intensity and phase of such pulses, both in temporal and frequency space.

The foregoing and other objects, features and advantages of the invention and preferred embodiments which are presently known and which carry out the invention, will become more apparent from a reading of the following description in connection with the accompanying drawings in which.

Figure 1:
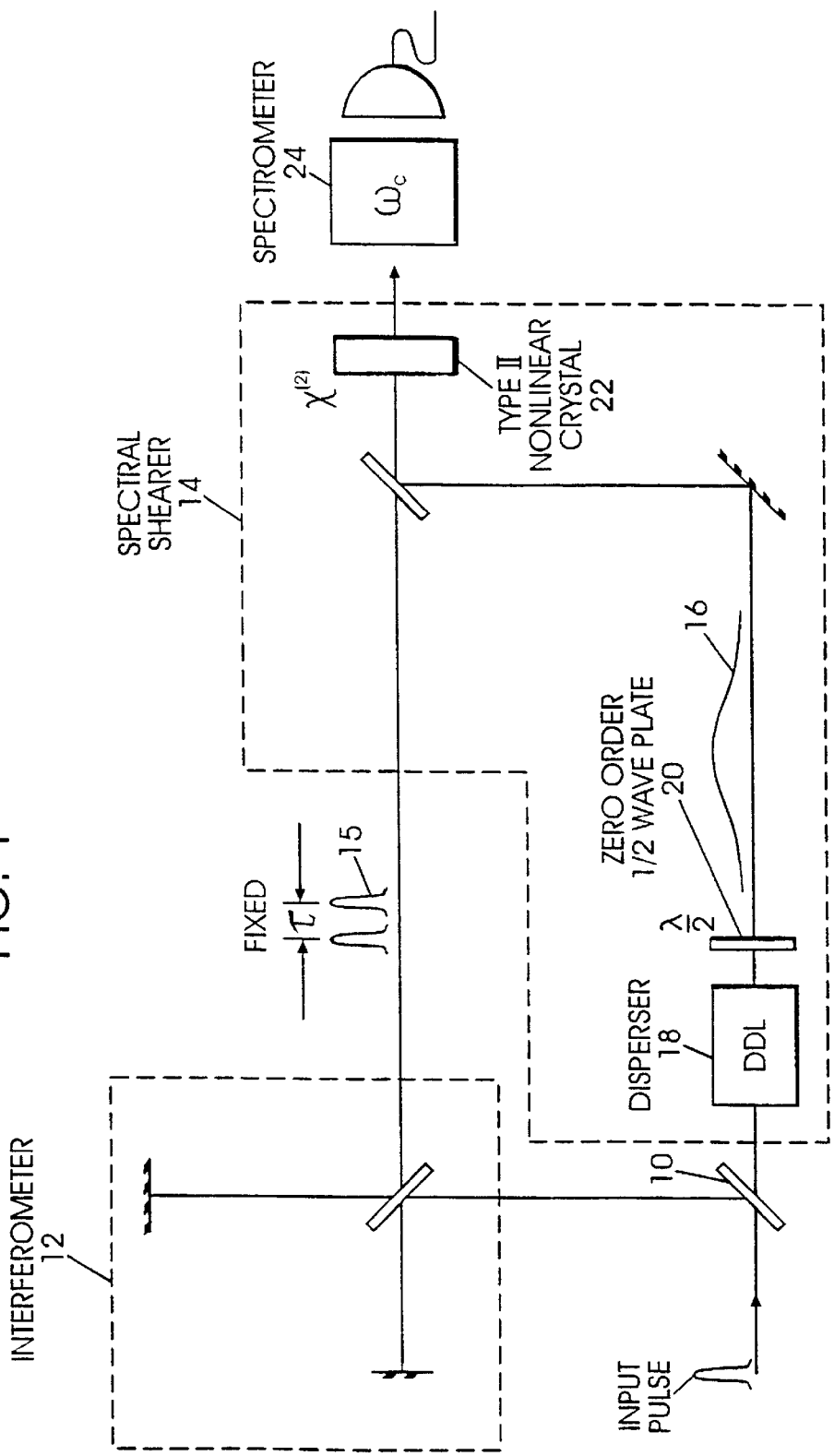
FIG. 1 is a block diagram of a SPIDER system where the elements of the system are disposed along collinear light paths and no moving components are required.
Figure 2:
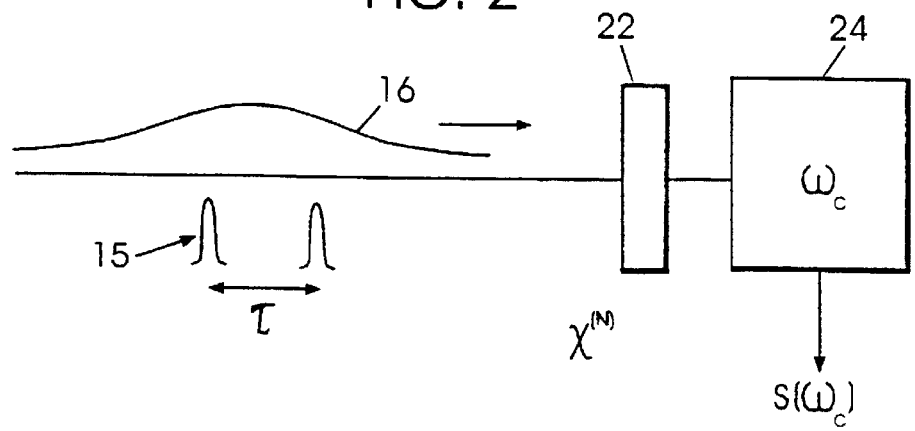
FIG. 2 is a more general depiction of SPIDER apparatus than is shown is FIG. 1.
Figure 5B:
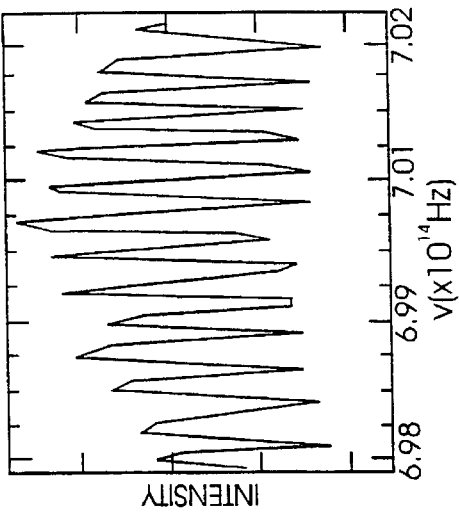
Figure 5A:
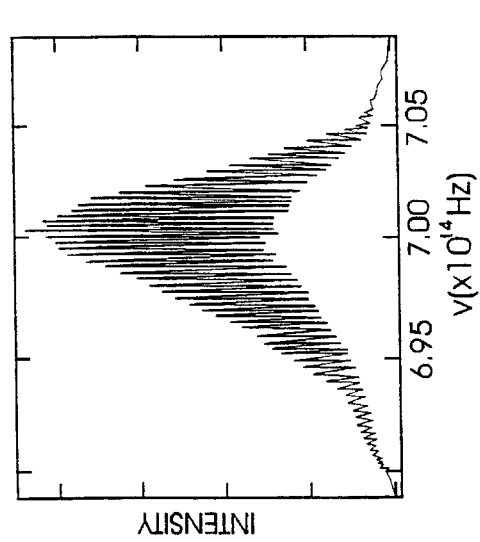
Figure 7:
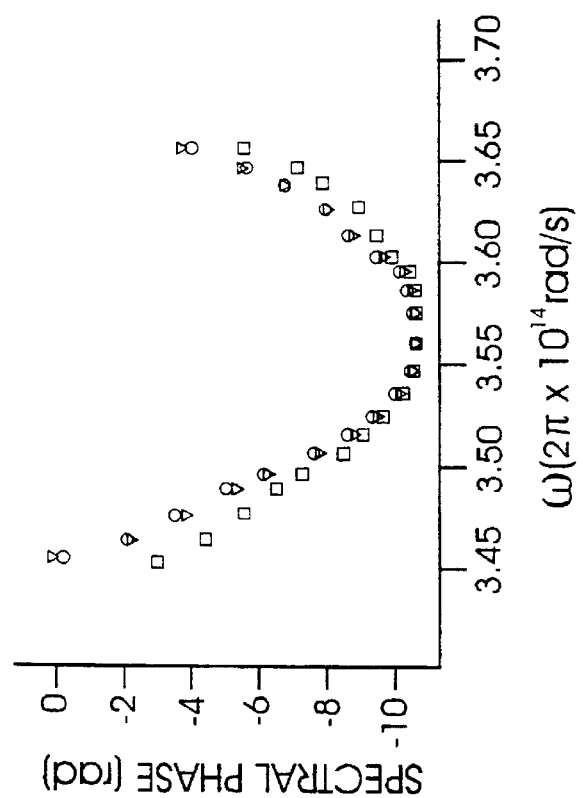
Figure 6:
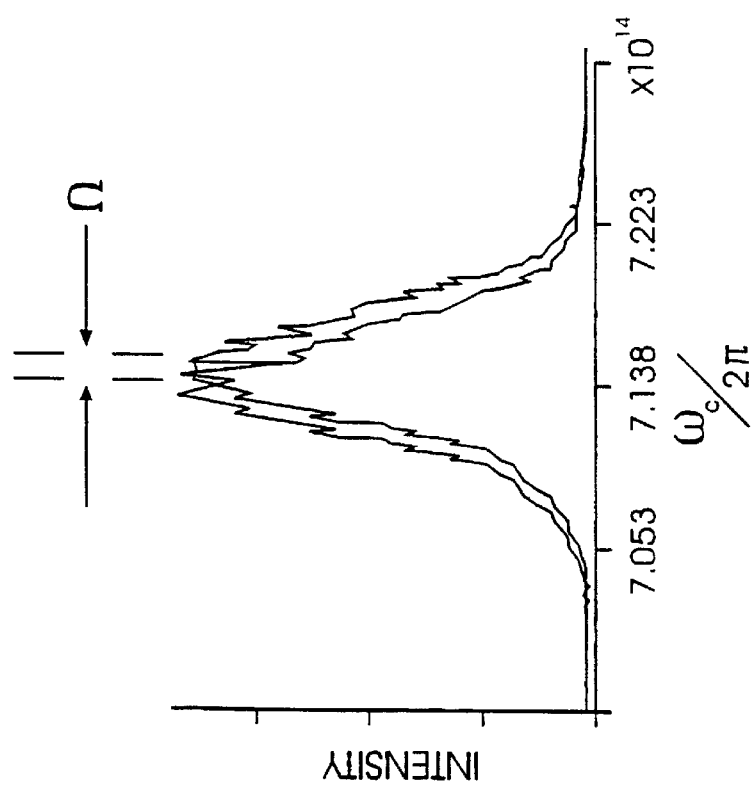

FIGS. 5(a), (b), (c), (d), respectively, are plots of an exemplary recorded spectral interferograrn which is obtained with the system shown in FIGS. 1 and 2, an expanded and enlarged view of the interferogram of FIG. 5(a), the spectral amplitude and phase with respect to frequency of the input pulse, and the spectral amplitude and phase distribution of the input pulse with respect to time; and FIG. 6 shows the measured sheared specrtra generated via upcorrersion using this appartus for pulses from a comercial modelocked Titanium-sapphire laser; and FIG. 7 is a plot which illustrates the quality of the pulse characterized with the system of FIGS. 1 & 2 by a measurement of the dispersion of a block of glass. The squares represent the spectral phase of the input pulse, measured using SPIDER, and the circles the same pulse after passing through a block of Bk7 optical glass. The triangles are the spectral phases expected from an independent measure of the glass dispersion.

Referring to FIG. 1 the input pulse to be characterized is picked off a beam splitter 10 and directed through a Michaelson interferometer 12. A thin etalon may also be used for this purpose. The output of the interferometer 12 is a pair of pulses 15 which are replicas of the input pulse but separated in time by the delay $\tau$. In order to generate the desired spectral shear $\delta\omega$ or $\Omega$, between the pair of pulses, a spectral shearer 14 provides the requisite spectral shear by upconverting the replicas with a stretched or chirped (frequency swept) replica 16 of the input pulse. It is also possible to use down conversion or self-or cross-phase modulation or some other non-linearity to achieve the spectral shear.

The portion of the pulse transmitted to the beam splitter 10 is passed through a disperser 18 which is shown as dispersive delay line (DDL). This delay line may be provided by a double pass of the input pulse through a tandem pair of gratings for example, having 1200 lines per mm. However, a pair of prisms or the material dispersion of a optical transmissive media or a fiber optic can be used as the disperser 18. T is the duration of the stretch pulse. T is much greater than $\tau$. For example, the stretched pulse might have a duration of 25 ps while $\tau$ may be 3 ps. It is preferred, but not essential, that the polarization of the stretched pulse be rotated with a zero order half wave plate 20 to facilitate up conversion with the replicas in a mixer provided by a nonlinear crystal 22. This crystal may be a Type II crystal of BBO (barium borate). The crystal is sufficiently long, for example 25 microns, in the direction of propagation of chirp pulse 16 and the replica pulse pair 15 there through to provide for the generation of up converted pulses suitable for detection by a spectrometer 24.

Since the input pulse on the replicas are subpicosecond pulses, the angular frequency bandwidth, temporal slices thereof which are mixed with the replicas, are essentially monochromatic. Thus the chirped pulse 16 provides a source of quasi-monochromatic light for the conversion and frequency shearing operation which is carried out in the crystal 22.

It will be observed that the elements of the apparatus are collinear, that is the interferometer, the DDL 18, the rotator 20 and the crystal 22 and spectrometer 24 are all along collinear light paths; thus providing for a compact and easily aligned instrument having no moving components, and in which there is no residual loss of temporal resolution due to the geometry.

The SPIDER signal, $S(\omega_c)$ is obtained from the interference of the spectrally sheared pulses. Typical pulses are shown in FIG. 6, as is their spectral shear $\Omega$. A typical SPIDER signal is also shown in FIG. 5(a). This signal is a spectrointerferogram having a series of fringes (oscillations). The relative positioning of these fringes contains information as to the frequency dependent phase of the input pulse being measured. These fringes in the central region of the pulse which is approximately at 7.00 in FIGS. 5(a) and (b), and is $\omega_c$ in the examples shown in these figures, which is approximately at the maximum intensity of the spectral amplitude of the interferogram.

As shown by the general presentation of the SPIDER in FIG. 2, the spectral interferogram signal $S(\omega_c)$ is generated by the interference of two replicas 15 of the pulse to be characterized. These replicas are identical except that they are shifted or sheared in frequency with respect to each other.

The interferogram, measured with an integrating detector provided by the spectrometer 24, is related to the input pulse spectrum by $$S(\omega_c) = |\tilde{E}(\omega_c)|^2 + |\tilde{E}(\omega_c+\Omega)|^2 + 2|\tilde{E}(\omega_c)\tilde{E}(\omega_c+\Omega)| \times \cos\,[\phi_w(\omega_c+\Omega) - \phi_w(\omega_c) + \omega_c\tau], \tag{1}$$

where $\overline{E}(\omega)$ is the frequency representation of the pulse electric field, $\Omega$ is the amount of spectral shear, which may also be written as $\delta\omega$, $\tau$ is the temporal delay between the two replicas, and $\omega_c$ is the variable center passband frequency of the spectrometer. The first two terms on the right-hand side of Eq. (1) are the individual spectra of the test pulse and its frequency-sheared replica, respectively. The third term provides the spectral phase in the form of the phase difference between spectral components separated by the shear $\Omega$. One obtains the spectral phase for a set of discrete frequencies separated by $\Omega$ from the spectral phase difference by adding up the appropriate phase differences. The spectral amplitude at these frequencies is obtained from the square root of an independently recorded pulse spectrum. A constant $|\,|$ may multiply the first term in eq. (1). A constant $|\beta|$ may multiply term. $|\beta|^4$ may multiply the third term. A constant may—be added to the term within the brackets.

A pulse, almost by definition, has nonzero energy only within a finite duration of time. Compact support in the time domain ensures that a finite sampling of the field in the frequency domain is sufficient for reconstructing the pulse exactly, as long as the sampling interval is no greater than the Nyquise limit. The Whittaker-Shannon sampling theorem asserts that, if the pulse to be measured has nonzero energy over a duration $\tau_N$, then a spectral shear of $2\pi/\tau_N$, and hence a sampling of the spectrum of the electric field at frequency intervals of $2\pi/\tau_N$, is sufficient for reconstructing the pulse's amplitude and phase exactly. As long as the spectral shear fulfills this requirement, measurement of the spectral shearing interferogram of Eq. (1) coupled with a measurement of the pulse spectrum is sufficient for complete pulse amplitude and phase reconstruction.

Figure 3:
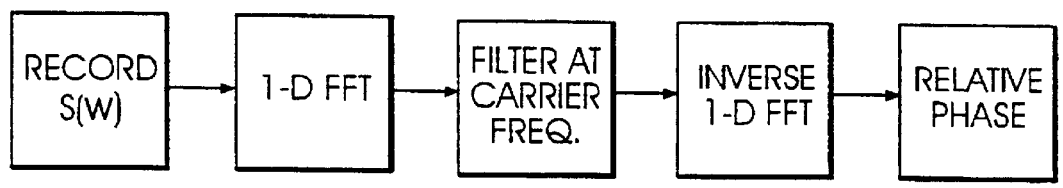
FIG. 3 is a block diagram illustrating the system for processing the spectral signal (interferogram) from the SPIDER apparatus shown in FIGS. 1 and 2.
Figure 4:
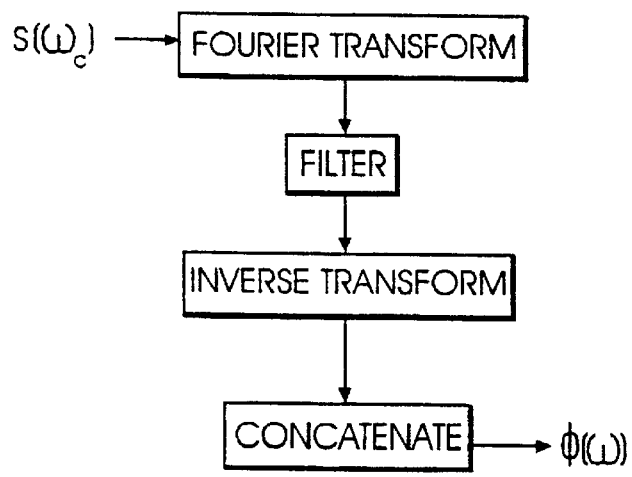
FIG. 4 is a simplified flow chart of the process carried out by the apparatus shown in FIG. 3.

Because the interferogram contains spectral fringes with a period of roughly $\tau^{-1}$, a phase retrieval procedure may be used which is diagranmmed schematically in FIG. 4 and more specifically in FIG. 3. The recorded spectral interferogram is Fourier transformed. The resulting time series has components centered near $\tau=\pm\tau$, as well as a component near t=0. The t=0 and t=–$\tau$ terms are removed by filtering, and the remaining signal is inverse transformed. On subtracting the term proportional to $\tau$ from the resulting phase distribution we are left with the relative phase, $\phi_w(\omega_c+\Omega)-\phi_w(\omega_c)$, between successive pairs of frequency components separated by $\Omega$. The spectral phase for a discrete set of frequencies separated by $\Omega$ is constructed by concatenation. This inversion routine in noniterative; the phase is directly retrieved from the data by a series of linear transformations.

The recorded spectral interferogram is Fourier transformed to the time domain, resulting in components at t=+$\tau$ and t=–$\tau$ as well as at t=0. The t=0 and t=–$\tau$ terms are discarded (filtered digitally) and the remaining signal is inverse transformed. After subtracting the carrier term from the resulting phase distribution leaving the desired relative phase, $\phi_w(\omega_c+\delta\omega)-\phi_w(\omega_c)$, between each pair of frequency components separated by $\delta\phi$. (In the limit of small bw this is approximately the group delay at $\phi_c$.)

Figure 5D:
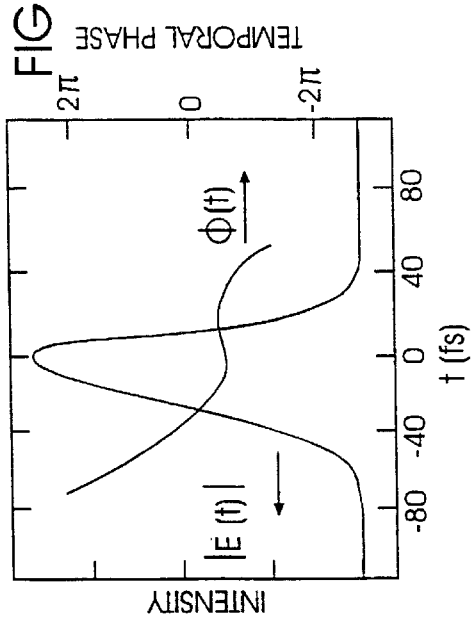
Figure 5C:
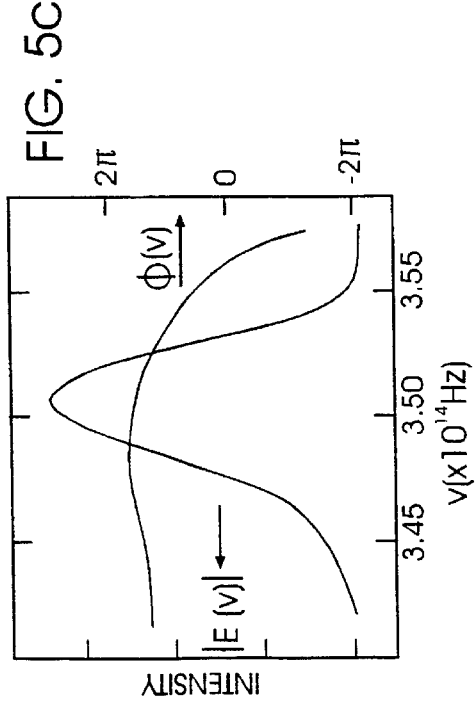

For typical short pulses where the replicas 15 are separated by $\tau$ of approximately 2 ps and where the dispersed pulse 16 was stretched to 25 ps, roughly a factor of 400, with a dispersion roughly equal to the band width of the input pulses, the spectral shear was approximately 8% of the total input pulse bandwidth and the up conversion was obtained with essentially monochromatic or "CW slices" of the stretched pulse. The pulse amplitude or intensity and relative phase in the frequency domain or frequency space is shown in FIG. 5(c), while the spectral amplitude (intensity) and phase of the pulse in the time or temporal domain is shown in FIG. 5(d).

FIG. 7 illustrates the spectral phase measured by the SPIDER system for the sheared pulses propagated through the DDL 18 (FIG. 1), while the plot made up of triangles shows the spectral phase contained using the spectrometer 24 and processing as described in connection with FIGS. 3 and 4. There is also shown a plot made up of circles which is the predicted spectral phase reconstruction, thereby showing that SPIDER is practicable for characterizing ultrashort optical pulses and is adapted to use different dispersers to obtain a chirped pulse.

Variations and modifications in the herein described system and method will undoubtedly suggest themselves to those skilled in the art. Accordingly, the foregoing description should be taken as illustrative and not in a limiting sense.

What is claimed is:

1. A method for measuring a pulse which comprises the step of translating said pulse into a pair of pulses which are sheared in frequency with respect to each other, and non-linearly processing said pair of pulses to derive an output which characterizes said pulse.

2. The method according to claim 1 wherein said output characterizes said pulse in accordance with the amplitude of said pulse, the phase of said pulse or both said amplitude and phase of said pulse over temporal or frequency space occupied by said pulse.

3. The method according to claim 1 wherein the pulse is an ultrashort optical pulse and said pair of pulses are both frequency shifted and spectrally sheared with respect to one another, by being offset in frequency and time with respect to each other.

4. The method according to claim 1 wherein said sheared pulses extend over a spectrum, and said processing step comprises interfering said shearing pulses to provide a signal, $S(\omega_c)$ having an amplitude with respect to a frequency in said spectrum $\omega_c$ which is represented approximately by the following equation:

$$S(\omega_c)=|\bar{E}(\omega_c)|^2+|\bar{E}(\omega_c+\Omega)|^2+2|\bar{E}(\omega_c)\bar{E}(\omega_c+\Omega)|\times\cos\,[\phi_w(\omega_c+\Omega)-\phi_w(\omega_c)+\omega_c\tau],$$

where $\bar{E}(\omega_c)$ is the frequency representation of the electric field of said pulse, $\Omega$ is the amount of spectral shear between said pair of pulses, $\tau$ is the temporal delay between said sheared pulses and $\phi_w$ is the phase with respect to frequency of said pulse, and further comprising the step of resolving said signal $S(\omega_c)$ into said output in terms of the temporal phase of said pulse, the temporal intensity of said pulse or both.

5. The method according to claim 1 wherein said translating step is carried out by producing in response to said pulse said pair of pulses one of which is delayed in time with respect to the other, and shearing said pair of pulses in frequency.

6. The method according to claim 5 wherein said shearing step is carried out by providing a signal which varies in frequency and is overlapping time relationship with said pair of pulses and has a duration longer than said time of delay of said pair of pulses, and mixing said pair of pulses with a signal which varies in frequency.

7. The method according to claim 6 wherein said signal is provided by chirping said pulse which is being measured.

8. The method according to claim 7 wherein said mixing step is carried out by applying said chirped signal and said delayed pair of pulses to a device having a non-linear response characteristic.

9. The method according to claim 5 wherein said processing step is carried out by analyzing the spectrum of a signal resulting from said mixing step to derive said output, which output represents the time and/or frequency dependent intensity and/or phase of said pulse being measured.

10. The method according to claim 9 wherein said analysis step is carried out by Fourier transformation followed by inverse Fourier transformation.

11. The method according to claim 5 wherein said pulse is an ultrashort optical pulse and said producing step is carried out by interferometrically generating a pair of replicas of said pulse in delayed time relationship to provide said pair of pulses.

12. The method according to claim 11 wherein said shearing step is carried out by dispersing said pulse being measured being spectrally spread said pulse over an interval longer than the time delay of said pair of pulses and in overlapping time relationship with said pair of pulses, and mixing said pair of pulses with said spectrally spread pulse to convert said pair of pulses into said spectrally sheared pulses.

13. The method according to claim 12 comprising propagating said pair of replica pulses and said spectrally spread pulse co-linearly.

14. Apparatus for measuring pulses to characterize the time and/or frequency dependent amplitude and phase thereof which comprises means for spectrally shearing said pulses by means of a non-linearity resulting in an output, and means for spectrally analyzing said output for obtaining the time and/or frequency dependent characteristics of said pulses, and wherein said pulses are ultrafast optical pulses and said spectral shearing means includes means for interferometrically generating a pair of replicas for each of said pulses with a temporal delay $\tau$ therebetween, and means for mixing said pair of replicas non-linearly with a chirped signal to provide a spectral interferogram representing the shear of said replicas by being shifted in frequency with respect to each other.

15. The apparatus according to claim 14 wherein each of said interferograms is related to the spectrum of each pulse being measured in accordance with the following equation:

$$S(\omega_c)=|\bar{E}(\omega_c)|^2+|\bar{E}(\omega_c+\Omega)|^2+2|\bar{E}(\omega_c)\bar{E}(\omega_c+\Omega)|\times\cos\,[\phi_w(\omega_c+\Omega)-\phi_w(\omega_c)+\omega_c\tau],$$

whereain $\omega_c$ is a frequency within the spectrum which varies, $S(\omega_c)$ is the amplitude variation with $\phi_c$ as $\phi_c$ varies, $\bar{E}$ is the frequency representation of the electric field of each of said pulses, $\tau$ is the temporal delay between the replicas of each of said pair of replicas, $\Omega$ is the amount of spectral shear, and $\phi_\omega$ is the frequency dependent phase of said pulses.

16. The apparatus according to claim 14 wherein said spectral interferogram providing means comprises means for dispersing in frequency each of said pulses over a period of time T, greater than $\tau$, which includes said pair of replicas of said pulses to provide time stretched and chirped pulses, and means for mixing said replica pairs and chirp pulses to provide said interferogram.

17. The apparatus according to claim 16 wherein said mixing means is an optically transmissive and nonlinear medium.

18. The apparatus according to claim 17 wherein said medium is a crystal sufficiently long to support propagation of said replicas combined with said chirped pulses to mix said replicas with different temporal and/or frequency displaced slices of said chirped pulses.

19. The apparatus of claim 14 further comprising an interferometer providing said interferometrically generating means, a dispersive line and a nonlinear mixing medium providing said interfering means, said interferometer, medium and line being arranged along co-linear light propagating paths.

20. The apparatus of claim 14 wherein said analyzing means comprises a spectrometer having an integrating detector to provide said interferogram, and means for Fourier processing of said interferogram to derive the time and frequency dependent amplitude and phase which characterize said pulses.

21. The apparatus of claim 20 wherein said Fourier processing includes Fourier transformation followed by inverse Fourier transformation.

* * * * *